(12) United States Patent
Demain

(10) Patent No.: US 6,727,332 B2
(45) Date of Patent: Apr. 27, 2004

(54) USE AND PRODUCTION OF POLYPROPYLENE

(75) Inventor: Axel Demain, Tourinnes-Saint-Lambert (BE)

(73) Assignee: Atofina Research S.A., Feluy (BE)

( * ) Notice: Subject to any disclaimer, the term of this patent is extended or adjusted under 35 U.S.C. 154(b) by 75 days.

(21) Appl. No.: 09/939,097

(22) Filed: Aug. 24, 2001

(65) Prior Publication Data

US 2002/0120080 A1 Aug. 29, 2002

Related U.S. Application Data

(63) Continuation of application No. PCT/EP00/01736, filed on Feb. 25, 2000.

(30) Foreign Application Priority Data

Feb. 26, 1999 (EP) .............................................. 99103803

(51) Int. Cl.[7] .............................. C08F 4/64; C08F 4/642; C08F 4/68; C08F 110/06
(52) U.S. Cl. ........................ 526/170; 526/160; 526/351; 526/943
(58) Field of Search ................................ 526/160, 943, 526/351, 170

(56) References Cited

FOREIGN PATENT DOCUMENTS

| EP | 0 537 130 A1 | 4/1993 |
|---|---|---|
| EP | 537 130 A1 * | 4/1993 |
| EP | 0 742 227 A2 | 11/1996 |
| EP | 0 870 779 A1 | 10/1998 |
| EP | 0 881 236 A1 | 12/1998 |
| EP | 881 236 A1 * | 12/1998 |
| EP | 0 905 173 A1 | 3/1999 |
| WO | WO 98/06760 | 2/1998 |

OTHER PUBLICATIONS

Yasushi Obora, Charlotte L. Stern and Tobin J. Marks; "Ancillary Ligand Effects in Chiral C1–Symmetric ansa–Metallocene Catalysts for Stereoregular Alpha–Olefin Polymerization. "Wingspan" Modification with Tahydrofluorene"; 1997 American Chemical Society, Organometallics, vol. 16, No. 12, 1997; pp. 2503–2505.

* cited by examiner

Primary Examiner—Roberto Rabago
(74) Attorney, Agent, or Firm—Hitt Gaines & Boisbrun

(57) ABSTRACT

Use of isotactic polypropylene homopolymers or copolymers in processes in which the polypropylene solidifies from a melt, wherein for enhanced speed of solidification of the polypropylene the polypropylene has a melt temperature and a crystallisation temperature not more than 50° C. less than the melt temperature resulting from the polypropylene having been produced using a metallocene catalyst component having the general formula: $R''(C_p R_1 R_2 R_3)(C_p' R_n')MQ_2$. $C_p$ and $C_p'$ are a substituted cyclopentadienyl ring, and a sybstituted or unsubstituted fluorenyl ring, respectively. R" is a structural bridge; $R_1$ is a substituent on the cyclopentadienyl ring distal to the bridge. The distal substituent comprises a bulky group of the formula $XR^*_a$. X is chosen from Group IVA. M is a Group IVB transition metal or vanadium and each Q is hydrocarbyl having 1 to 20 carbon atoms or is a halogen.

6 Claims, No Drawings

USE AND PRODUCTION OF POLYPROPYLENE

CROSS-REFERENCE TO RELATED APPLICATIONS

This application is a continuation application of International Application No. PCT/EP00/01736, entitled USE AND PRODUCTION OF POLYPROPYLENE, filed on Feb. 25, 2000. The above-listed application is commonly assigned with the present invention and is incorporated herein by reference as if reproduced herein in its entirety.

TECHNICAL FIELD AND SUMMARY OF THE INVENTION

The present invention relates to the use of homopolymers and copolymers of propylene prepared with a metallocene catalyst component in applications which require a low melting temperature, a high crystallisation temperature and a high transparency. The present invention also relates to a process for producing isotactic polypropylene homopolymers.

BACKGROUND

It is known in the art to obtain polypropylene with low melting temperature by inserting comonomers in the polymer chain during polymerisation. With Ziegler-Natta catalysts, the addition of ethylene (or other) comonomers in the growing chains of polypropylene during polymerisation gives rise to a random propylene copolymer that is characterised by a lower melting point, a lower flexural modulus, lower rigidity and higher transparency that the homopolymers of propylene. The comonomers generate defects in the polymer chain which impede the growth of thick crystalline structures and reduce the degree of crystallinity of the overall polymer. The comonomers are not evenly distributed in the polymer chains. Among the many comonomers that can be used in the copolymerisation process, ethylene and butene have been most frequently utilised. It has been observed that the melting temperature of the propylene copolymers is reduced by about 6° C. per wt % of inserted ethylene in the copolymer chain or by about 3° C. per wt % of inserted butene.

The addition of comonomer in industrial polymerisation processes has however other impacts than just decreasing the melting temperature of the polypropylene; it has both economical and technical impacts.

These known random propylene copolymers also suffer from the technical problem that the crystallisation temperature is relatively low. This is technically disadvantageous when the polypropylene is being processed since the low crystallisation temperature increases the cycle time of any process where the polypropylene is being solidified from the melt. With the lower crystallisation temperatures, the period for solidification is longer, thereby increasing the cycle time for injection moulding, injection blow moulding and extrusion blow moulding and decreasing the production line speed in film, tube, profile or pipe extrusion.

EP-A-0881236 in the name of Fina Research S.A. and EP-A-0537130 in the name of Fina Technology, Inc. each disclose a metallocene catalyst component for use in producing isotactic polypropylene.

EP-A-0870779 in the name of Fina Technology, Inc. discloses metallocene catalysts for producing a blend of iso-and syndiotactic polypropylene.

EP-A-0742227 in the name of Fina Technology, Inc. discloses a metallocene compound for producing hemisotactic polypropylene.

EP-A-0905173 discloses the production of biaxially oriented metallocene-based polypropylene films.

Despite the disclosures of these prior Fina patent specifications, there is a need in the art for polypropylene having not only relatively low melting temperature but also relatively high crystallisation temperature which enables the polypropylene to be used more readily in processes requiring the polypropylene to be solidified from the melt using shorter cycle times or higher film speeds.

Accordingly, the present invention provides use of isotactic polypropylene homopolymers or copolymers in processes in which the polypropylene solidifies from a melt.

DETAILED DESCRIPTION

In a preferred embodiment, the present invention is directed to the use of isotactic polypropylene homopolymers or copolymers in processes in which the polypropylene solidifies from a melt, wherein for enhanced speed of solidification of the polypropylene the polypropylene has a melt temperature and a crystallisation temperature not more than 50° C. less than the melt temperature resulting from the polypropylene having been produced using a metallocene catalyst component having the general formula:

$$R''(C_p R_1 R_2 R_3)(C_{p'} R_n')MQ_2 \qquad (I)$$

wherein $C_p$ is a substituted cyclopentadienyl ring; $C_{p'}$ is a substituted or unsubstituted fluorenyl ring; R" is a structural bridge imparting stereorigidity to the component; $R_1$ is a substituent on the cyclopentadienyl ring which is distal to the bridge, which distal substituent comprises a bulky group of the formula $XR^*_a$ in which X is chosen from Group IVA, and when a=3 each R* is the same or different and chosen from hydrogen or hydrocarbyl of from 1 to 20 carbon atoms, or when a=2 one R* is chosen from hydrogen or hydrocarbyl of from 1 to 20 carbon atoms and the other different R* is chosen from a substituted or unsubstituted cycloalkyl where X is a carbon atom in the cycloalkyl ring, $R_2$ is a substituent on the cyclopentadienyl ring which is proximal to the bridge and positioned non-vicinal to the distal substituent and is hydrogen or of the formula $YR\#_3$ in which Y is chosen from Group IVA, and each R# is the same or different and chosen from hydrogen or hydrocarbyl of 1 to 7 carbon atoms, $R_3$ is a substituent on the cyclopentadienyl ring which is proximal to the bridge and is a hydrogen atom or is of the formula $ZR\$_3$ in which Z is chosen from Group IVA, and each R$ is the same or different and chosen from hydrogen or hydrocarbyl of 1 to 7 carbon atoms, each $R'_n$ is the same or different and is hydrocarbyl having 1 to 20 carbon atoms in which $0 \leq n \leq 8$; M is a Group IVB transition metal or vanadium and each Q is hydrocarbyl having 1 to 20 carbon atoms or is a halogen.

The metallocene catalyst component may be employed either alone or in a mixture of one or more metallocene catalyst components.

In accordance with the invention, it has now been found that homopolymers and copolymers of propylene obtained using these metallocene catalysts have characteristics which are similar to and better than those exhibited by random polypropylene (PP) copolymers produced using Ziegler-Natta catalysts. These desired characteristics are not only a low melting temperature and a high transparency, but also a high crystallisation temperature. The polymers usable in accordance with the invention can also tend to have higher rigidity as compared to random PP copolymers produced using Ziegler-Natta catalysts and higher flexibility than homopolymers produced using Ziegler-Natta catalysts. As well as having high transparency, the preferred polymers for use in the invention also have low haze.

The present invention is predicated on the discovery by the inventor that the use of particular metallocene catalysts enables polypropylene homopolymers, or polypropylene copolymers with a small amount of comonomer, to have a combination of relatively low melting temperature and relatively high crystallisation temperature which reduces the cycle time for processing the polymer from the melt, for example in injection moulding and injection or extrusion blow moulding. The amount of comonomer in the copolymers is not more than 25 wt %, typically less than 10 wt %, more preferably less than 5 wt % and yet more preferably less than 3 wt %. Typical comonomers are ethylene and butene, but other alpha-olefins may be employed. For extrusion processes, such as pipe, tube or profile extrusion and for film production, the higher crystallisation temperature permits higher line speeds. The film may be produced by casting, a tenter frame process or blowing. Other polyolefin processing methods exist for which the present invention has utility in which the polypropylene is processed from the melt. The combination of a low melting temperature and a high crystallisation temperature provides a reduced temperature "window" between those two temperatures, which enables the polypropylene to be more easily and more quickly processed when the polypropylene is processed in the melt and then solidified from the melt.

Thus the present invention further provides a process for producing an isotactic homopolymer of propylene having a melt temperature of from 139 to 144° C. and a difference between the melt temperature and the crystallisation temperature of not more than 50° C., the process comprising homopolymerising propylene in the presence of a metallocene catalyst of general formula:

$$R''(C_p R_1 R_2 R_3)(C_p' R_n')MQ_2 \qquad (I)$$

wherein $C_p$ is a substituted cyclopentadienyl ring; $C_p'$ is a substituted or unsubstituted fluorenyl ring; R" is a structural bridge imparting stereorigidity to the component; $R_1$ is a substituent on the cyclopentadienyl ring which is distal to the bridge, which distal substituent comprises a bulky group of the formula $XR^*_a$ in which X is chosen from Group IVA, a=2, and one R* is chosen from hydrogen or hydrocarbyl of from 1 to 20 carbon atoms and the other different R* is chosen from a substituted or unsubstituted cycloalkyl where X is a carbon atom in the cycloalkyl ring, $R_2$ is a substituent on the cyclopentadienyl ring which is proximal to the bridge and positioned non-vicinal to the distal substituent and is of the formula $YR\#_3$ in which Y is chosen from Group IVA, and each R# is the same or different and chosen from hydrogen or hydrocarbyl of 1 to 7 carbon atoms, $R_3$ is a substituent on the cyclopentadienyl ring which is proximal to the bridge and is a hydrogen atom or is of the formula $ZR\$_3$ in which Z is chosen from Group IVA, and each R$ is the same or different and chosen from hydrogen or hydrocarbyl of 1 to 7 carbon atoms, each $R'_n$ is the same or different and is hydrocarbyl having 1 to 20 carbon atoms in which $0 \leq n \leq 8$; M is a Group IVB transition metal or vanadium and each Q is hydrocarbyl having 1 to 20 carbon atoms or is a halogen.

The metallocene catalyst may be used either alone or in a mixture of such metallocene catalysts.

In the bulky distal substituent group $R_1$, X is preferably C or Si. When a is 3, R* may be a hydrocarbyl such as alkyl, aryl, alkenyl, alkyl aryl or aryl alkyl, preferably methyl, ethyl, propyl, isopropyl, butyl, isobutyl, amyl, isoamyl, hexyl, heptyl, octyl, nonyl, decyl, cetyl or phenyl. $R_1$ may comprise a hydrocarbyl which is attached to a single carbon atom in the cyclopentadienyl ring or may be bonded to two carbon atoms in that ring. Preferably, $R_1$ is $C(CH_3)_3$. When a is 2, one R* is a substituted or unsubstituted cycloalkyl group, with X being C and incorporated in the cycloalkyl ring. Thus $R_1$ may comprise an alkyl-cycloalkyl group, typically methyl-cyclohexyl.

The proximal substituents $R_2$ and $R_3$ are the same or different and preferably $CH_3$ or hydrogen.

R" is preferably isopropylidene in which the two $C_p$ rings are bridged at position 2 of the isopropylidene.
M is preferably zirconium.
Q is preferably a halogen and more preferably Cl.

The fluorenyl ring $C_p'$ can have up to 8 substituent groups $R'_n$, each of which is the same or different and may be hydrogen or a hydrocarbyl selected from alkyl, aryl, alkenyl, alkyl aryl or aryl alkyl, such as methyl, ethyl, propyl, isopropyl, butyl, isobutyl, amyl, isoamyl, hexyl, heptyl, octyl, nonyl, decyl, cetyl or phenyl. These substituents must be selected so that they do not interfere with coordination of the monomer to the metal. Preferably, therefore, the fluorenyl ring is unsubstituted at both positions 4 and 5, these positions being distal to the bridge.

The metallocene catalyst component can be used to produce isotactic polypropylene homopolymer, optionally with a small amount of comonomer incorporated therein, i.e. a homopolymer with a low degree of copolymer. Both types of polypropylene are characterised by a low melting temperature and a high crystallisation temperature.

In accordance with a preferred aspect of the invention, the catalyst, which is selected from the cyclopentadienyl fluorenyl family, is used in a homogeneous or heterogeneous (i.e. supported catalyst) polymerisation for producing isotactic polypropylene homopolymer. In one preferred embodiment, the catalyst is a methyl cyclohexyl disubstituted cyclopentadienyl fluorenyl. Another preferred catalyst is tertiary butyl disubstituted cyclopentadienyl fluorenyl. In a further embodiment, the catalyst may be a tertiary butyl monosubstituted cyclopentadienyl fluorenyl. Such cyclopentadienyl fluorenyl metallocene catalysts enable relatively low melting points to be achieved, typically lower than 145° C. for isotactic polypropylene.

By carefully selecting the catalyst formulation, isotactic polypropylene having differing melting points can be obtained without using any comonomer. A melting point as low as 120° C. is achievable using these catalysts in isotactic polypropylene homopolymer. If a small concentration of comonomer for example ethylene or butene, is added to the propylene during polymerisation, a melting point lower than 120° C. may be achieved.

Compared to known polypropylene copolymers or homopolymers fabricated using Ziegler-Natta catalysts, for a given melting temperature higher crystallisation temperatures are achieved in accordance with the invention. This provides for example a significant reduction in the cycle time for injection moulding and injection and extrusion blow moulding and higher line speeds for production of film, together with reduced stickiness of the films and higher production speeds for pipe, tube and profile extrusion. The selection of a cyclopentadienyl metallocene catalyst also provides improved mechanical properties, in particular flexural and tensile properties, for the isotactic polypropylene. Furthermore, the polypropylenes produced in accordance with the invention have good light transmittance, including high transparency and low haze.

When the polymers produced in accordance with the invention are employed to produce articles by a processing technique, such as injection moulding, injection or extrusion blow moulding, or production of films, or extrusion of pipes, tubes or profiles, the polypropylene can be employed either in its pure form, or in a blend. When used pure, the polypropylene can be a layer of a multilayer or any other type of construction.

In accordance with the invention, the provision of an isotactic polypropylene homopolymer, optionally with a small degree of copolymer therein, provides not only a relatively low melting temperature of the polymer, but also a high crystallisation temperature. This in turn reduces the temperature "window" between those two temperatures to typically less than about 50° C. This greatly improves the processability of the polypropylene polymer since not only is it possible to process the polymer melt at lower temperatures, but also the speed of solidification of the polypropylene from the melt is enhanced as a result of the increased crystallisation temperature for a given melt temperature.

When the catalyst is a tertiary butyl monosubstituted cyclopentadienyl fluorenyl catalyst, the catalyst may comprise isopropylidene (3-tert butyl-cyclopentadienyl-fluorenyl) $ZrCl_2$. The production of such a catalyst is disclosed in EP-A-0537130. This catalyst produces isotactic polypropylene of low isotacticity, typically having 75 to 80% mmmm and a melting point of around 127 to 129° C. The polymer produced has a low molecular weight typically ranging from about 50,000 to 75,000 Mw.

When the catalyst comprises a tertiary butyl disubstituted cyclopentadienyl fluorenyl metallocene catalyst, the catalyst may particularly comprise isopropylidene (3-tert butyl-5-methyl cyclopentadienyl-fluorenyl) $ZrCl_2$. The synthesis of such a catalyst is disclosed in EP-A-0881236. This catalyst has a higher productivity than the corresponding monosubstituted catalyst described above, and the polymer produced has a higher molecular weight, a higher isotacticity and a higher melting point. Typically, the tacticity ranges from about 83 to 86% mmmm and the melting point ranges from about 139 to 144° C. With the additional hydrocarbyl group at the five position in the cyclopentadienyl group, the amount of regio defects is reduced below the limit of detection of the NMR, i.e. to less than 0.1% regio defects.

The preferred methyl cyclohexyl disubstituted catalyst incorporates a cycloalkyl group at the three-position of the cyclopentadienyl ring. The synthesis of the methyl cyclohexyl disubstituted cyclopentadienyl fluorenyl is similar to that of the tertiary butyl disubstituted cyclopentadienyl fluorenyl catalyst but cyclohexane is used instead of acetone in the synthesis of the fulvene. Like the tertiary butyl disubstituted catalyst, the methyl cyclohexyl disubstituted catalyst produces isotactic polypropylene homopolymers having a high degree of tacticity, where mmmm is typically around 80% and a low level of regio defects, typically less than 0.1%. The melting point is around 140° C. Generally, the isotacticity and the melting point are slightly lower for the methyl cyclohexyl disubstituted catalyst as compared to the tertiary butyl disubstituted catalyst.

The catalyst may be a trisubstituted cyclopentadienyl fluorenyl catalyst, with for example tertiary butyl or an alkyl-cycloalkyl group at the three-position of the cyclopentadienyl ring.

When copolymerisation is selected for lower the melting temperature, metallocene catalysts offer two significant advantages over the Ziegler-Natta catalysts. First, the insertion of comonomer is more periodic, for all chain lengths, and therefore less comonomer is required for a given decrease in the melting temperature. Les comonomer is thus necessary in order to reach the desired low melting temperature. The use of comonomer to lower the melting point is thus more efficient. Second, the melting temperature of the isotactic homopolymers of propylene produced with metallocene catalysts is lower than that of the homopolymers obtained with the Ziegler-Natta catalysts. The metallocene catalysts used in accordance with the invention are Cp-Fluorenyl metallocene catalysts which produce homopolymers with melting temperatures of below 145° C.

The catalyst system for use in preparing isotactic polypropylene comprises (a) a catalyst component as defined above; and (b) an aluminium- or boron-containing cocatalyst capable of activating the catalyst component. Suitable aluminium-containing cocatalysts comprise an alumoxane, an alkyl aluminium and/or a Lewis acid.

The aluminoxanes usable as such cocatalysts are well known and preferably comprise oligomeric linear and/or cyclic alkyl alumoxanes represented by the formula:

for oligmomeric, linear alumoxanes and

for oligomeric, cyclic alumoxanes, wherein n is 1–40, preferably 10–20, m is 3–40, preferably 3–20 and R is a $C_1$–$C_8$ alkyl group and preferably methyl. Generally, in the preparation of alumoxanes from, for example, aluminium trimethyl and water, a mixture of linear and cyclic compounds is obtained.

Suitable boron-containing cocatalysts may comprise a triphenylcarbenium boronate such as tetrakis-pentafluorophenyl-borato-triphenylcarbenium as described in EP-A-0427696, or those of the general formula [L'-H]+[B $Ar_1$ $Ar_2$ $X_3$ $X_4$]— as described in EP-A-0277004 (page 6, line 30 to page 7, line 7).

The catalyst system may be employed in a solution polymerisation process, which is homogeneous, or a slurry process which is heterogeneous. In a solution process, typical solvents include hydrocarbons with 4 to 7 carbon atoms such as heptane, toluene or cyclohexane. In a slurry process it is necessary to immobilise the catalyst system on an inert support, particularly a porous solid support such as talc, inorganic oxides and resinous support materials such as polyolefin. Preferably, the support material is an inorganic oxide in its finely divided form.

Suitable inorganic oxide materials which are desirably employed include Group 2a, 3a, 4a or 4b metal oxides such as silica, alumina and mixtures thereof. Other inorganic oxides that may be employed either alone or in combination with the silica, or alumina are magnesia, titania, zirconia, and the like. Other suitable support materials, however, can be employed for example, finely divided functionalised polyolefins such as finely divided polyethylene.

Preferably, the support is a silica having a surface area comprised between 200 and 700 $m^2$/g and a pore volume comprised between 0.5 and 3 ml/g.

The amount of alumoxane and metallocenes usefully employed in the preparation of the solid support catalyst can vary over a wide range. Preferably the aluminium to transition metal mole ratio is in the range between 1:1 and 100:1, preferably in the range 5:1 to 50:1.

The order of addition of the metallocenes and alumoxane to the support material can vary. Alumoxane dissolved in a suitable inert hydrocarbon solvent may be added to the support material slurried in the same or other suitable hydrocarbon liquid and thereafter a mixture of the metallocene catalyst component is added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane; cycloalkanes such as cyclopentane and cyclohexane, and aromatics such as benzene, toluene, ethylbenzene and diethylbenzene.

Preferably the support material is slurried in toluene and the metallocene and alumoxane are dissolved in toluene prior to addition to the support material.

The present invention will now be described in greater detail with reference to the following non-limiting Example.

EXAMPLE 1

An isotactic polypropylene homopolymer was produced using, as a metallocene catalyst, isopropylidene (3-methylcyclohexyl-5-methyl cyclopentadienyl-fluorenyl) $ZrCl_2$.

The polymerisation was performed in a bench liquid full loop reactor in the slurry phase by introducing the metallocene catalyst precontacted with MAO (methylaluminoxane). The catalyst was unsupported. The polymerisation temperature was 60° C. The productivity of the catalyst was 65,000 gPP/gcat/h. The fluff was stabilised with conventional antioxidants and then extruded and pelletised before being injection moulded into bars.

Isotactic polypropylene having a melt temperature of 142° C. was obtained. The polypropylene obtained was monomodal. The isotactic polypropylene had a tacticity of 80% mmmm, with less than 0.1% regio defects. The tacticity was determined by NMR analysis and the remaining NMR results are shown in Table 1.

The polymer was also subjected to differential scanning calorimetry (DSC) to determine the melting temperature Tm and the crystallisation temperature Tc of the polypropylene. The results are shown in Table 2.

The polypropylene was also tested to determine its melt index MI2. The melt index was determined using the procedure of ASTM-A-1238 using a load of 2.16 kg at a temperature of 190° C. The melt index MI2 of the polypropylene was 1.5 g/10 min.

In addition, the flexural modulus of the polypropylene was determined using the procedures of ISO R178 and the results are shown in Table 2.

COMPARATIVE EXAMPLES 1 AND 2

As a comparison to the polypropylene homopolymer produced in accordance with the invention, the corresponding properties indicated in Table 2 for Example 1 were determined for a known random PP copolymer produced using a Ziegler-Natta catalyst with roughly the same melting point and MFI as for the polypropylene of Example 1 (Comparative Example 1) and for a known PP homopolymer using a Ziegler-Natta catalyst (Comparative Example 2). The sample of Comparative Example 1 was a random copolymer containing about 3.5 wt % of ethylene monomer.

A comparison of the results for Example 1 and Comparative Examples 1 and 2 shows that the melting point of the isotactic polypropylene homopolymer is slightly larger than that of the random polypropylene containing about 3.5 wt % of ethylene. However, in accordance with the invention the crystallisation temperature of the isotactic polypropylene is much higher, about 12° C. higher, than that of the random polypropylene. The isotactic polypropylene has a difference between Tm and Tc of less than 50° C. This is a significant reduction in the temperature difference that can result in a dramatic improvement in processing performance, leading to a decrease of cycle time for injection moulding and injection and extrusion blow moulding, an increase in the line speed and a reduction in the stickiness of the film for extruding and blowing films, and an increase in the production speed for pipe, tube and profile extrusion.

For the polypropylene homopolymer of Comparative Example 2, the melting temperature is around 163° C. which is higher than for Example 1 and the crystallisation temperature is also higher than for Example 1 and Comparative Example 1, being around 100° C. This yields a temperature window between the melting temperature and the crystallisation temperature which is more than 60° C., i.e. significantly broader than that achievable in accordance with the invention.

The flexural modulus of the isotactic polypropylene is about 20% larger than that of the random polypropylene of Comparative Example 1. For the polypropylene homopolymer of Comparative Example 2, this had a higher flexural modulus as compared to the polymer of Example 1. However the homopolymer of Comparative Example 2 has lower transparency and requires higher processing temperatures than the isotactic polymer of Example 1.

TABLE 1

| | |
|---|---|
| mmmm | 80.38 |
| mmmr | 6.04 |
| rmmr | 1.91 |
| mmrr | 5.43 |
| rmrr + mrmm | 0.88 |
| mrmr | 0.33 |
| rrrr | 1.30 |
| mrrr | 1.13 |
| mrrm | 2.61 |
| mm | 88.32 |
| mr | 6.64 |
| rr | 5.04 |
| r | 8.36 |

TABLE 2

| | Units | Example 1 | Comparative Example 1 | Comparative Example 2 |
|---|---|---|---|---|
| MI2 | g/10 min | 1.5 | 3.9 | 13.4 |
| Tm | ° C. | 142.1 | 138.7 | 163.1 |
| Tc | ° C. | 96.3 | 84.3 | 100.6 |
| FLEXURAL MODULUS | | | | |
| Flex. Mod. at 0.25% | MPa | 904 | 749 | 1209 |
| Flex. Mod. at 1% | MPa | 868 | 718 | 1172 |

What is claimed is:

1. A process for producing an isotactic homopolypropylene or copolymers of propylene with enhanced speed of solidification when solidifying from a melt, a difference between a melt temperature and a crystallization temperature not more than 50° C., the process comprising polymerizing the isotactic homopolypropylene or copolymers of propylene in the presence of a metallocene catalyst component having the general formula:

$$R''(C_pR_1R_2R_3)(C_p'R_n')MQ_2 \qquad (I)$$

wherein $C_p$ is a substituted cyclopentadienyl ring; $C_p'$ is a substituted or unsubstituted fluorenyl ring; R" is a structural bridge imparting stereorigidity to the component; $R_1$ is a substituent on the cyclopentadienyl ring which is distal to the bridge, which distal substituent comprises a bulky group of the formula $XR^*_2$ in which X is chosen from Group IVA, and one R* is chosen from hydrogen or hydrocarbyl of from 1 to 20 carbon atoms and the other different R* is chosen from a substituted or unsubstituted cycloalkyl where X is a carbon atom in the cycloalkyl ring, $R_2$ is a substituent on the cyclopentadienyl ring which is proximal to the bridge and positioned non-vicinal to the distal substituent and is hydrogen or of the formula $YR\#_3$ in which Y is chosen from Group IVA, and each R# is the same or different and chosen from hydrogen or hydrocarbyl of 1 to 7 carbon atoms, $R_3$ is a substituent on the cyclopentadienyl ring which is proximal to the bridge and is a hydrogen atom or is of the formula $ZR\$_3$ in which Z is chosen from Group IVA, and each R$ is the same or different and chosen from hydrogen or hydrocarbyl of 1 to 7 carbon atoms, each $R'_n$ is the same or different and is hydrogen or hydrocarbyl having 1 to 20 carbon atoms in which $0 \leq n \leq 8$; M is a Group IVB transition metal or vanadium and each Q is hydrocarbyl having 1 to 20 carbon atoms or is a halogen.

2. The process of claim 1, wherein $R_1$ is a methylcyclohexyl group.

3. The process of claim 2 wherein $R_2$ is a methyl group.

4. The process of claim 2 wherein $R_2$ is hydrogen.

5. The process of claim 1 wherein each R" is hydrogen.

6. The process of claim 1 wherein Y is carbon.

* * * * *